US011706108B2

United States Patent
Maggiore et al.

(10) Patent No.: US 11,706,108 B2
(45) Date of Patent: Jul. 18, 2023

(54) METHOD AND SYSTEM FOR DETERMINING A QUALITY OF EXPERIENCE DURING A REAL-TIME COMMUNICATION SESSION

(71) Applicant: TELECOM ITALIA S.p.A., Milan (IT)

(72) Inventors: Giulio Carmelo Maggiore, Rome (IT); Manuela Vaser, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 17/051,009

(22) PCT Filed: Apr. 23, 2019

(86) PCT No.: PCT/EP2019/060285
§ 371 (c)(1),
(2) Date: Oct. 27, 2020

(87) PCT Pub. No.: WO2019/211116
PCT Pub. Date: Nov. 7, 2019

(65) Prior Publication Data
US 2021/0234773 A1    Jul. 29, 2021

(30) Foreign Application Priority Data
Apr. 30, 2018   (IT) .................. 102018000004973

(51) Int. Cl.
*H04L 41/5067* (2022.01)
*H04L 41/5009* (2022.01)
(Continued)

(52) U.S. Cl.
CPC ...... *H04L 41/5067* (2013.01); *H04L 41/5009* (2013.01); *H04L 41/5087* (2013.01); *H04L 65/80* (2013.01)

(58) Field of Classification Search
CPC .. H04L 41/5067; H04L 41/5009; H04L 65/80
See application file for complete search history.

(56) References Cited

U.S. PATENT DOCUMENTS 10,063,431 B1 *   8/2018  Kollipara ............. H04W 24/10
2008/0155087 A1 * 6/2008  Blouin ................ H04L 41/5006
                                                      709/223
(Continued)

OTHER PUBLICATIONS

Alreshoodi et al. "Survey on QoE\QoS Correlation Models for Multimedia Services", IJDPS, vol. 4, No. 3, May 2013 [retrieved on Aug. 26, 2021]. DOI: 10.5121/ijdps.2013.4305. Retrieved from the Internet: <URL: https://arxiv.org/ftp/arxiv/papers/1306/1306.0221.pdf> (Year: 2013).*
Vizzarri et al. "Quality of Experience Analysis for VoLTE Services through Artificial Neural Network Fitting", 2016 WINCOM, Oct. 26, 2016 [retrieved on Feb. 1, 2022], Retrieved from the Internet: <URL: https://ieeexplore.ieee.org/document/7777208>. (Year: 2016).*

(Continued)

*Primary Examiner* — Kevin T Bates
*Assistant Examiner* — Dae Kim
(74) *Attorney, Agent, or Firm* — Oblon, McClelland, Maier & Neustadt, L.L.P.

(57) ABSTRACT

A method for determining a Quality of Experience associated with a real-time communication session between user devices includes monitoring the real-time communication session and determining at least one quality indicator of the Quality of Experience, at least one first performance indicator of a Quality of Service, and at least one second performance indicator of the Quality of Service. Based on the quality indicator and the first performance indicator, the method determines, among a family of correlation functions indicative of the correlation between the Quality of Experience and a Quality of Service in respect of a generic real-time communication session, a correlation function which is indicative of the correlation between the Quality of Experience and the Quality of Service in respect of the monitored real-time communication session. Then the method applies the first performance indicator and the (Continued)

second performance indicator to the correlation function to determine said Quality of Experience.

15 Claims, 2 Drawing Sheets

(51) Int. Cl.
  *H04L 41/50* (2022.01)
  *H04L 65/80* (2022.01)

(56) References Cited

U.S. PATENT DOCUMENTS

| | | | | |
|---|---|---|---|---|
| 2010/0315968 A1* | 12/2010 | Zhou | .................... | H04L 1/0009 370/252 |
| 2017/0214744 A1* | 7/2017 | Neves | .................... | H04L 67/12 |
| 2019/0313267 A1* | 10/2019 | Joul | .................... | H04L 67/303 |

OTHER PUBLICATIONS

Pal et al. "Effect of network QoS on user QoE for a mobile video streaming service using H.265/VP9 codec", Procedia Computer Science, vol. 111, pp. 214-222, 2017 [retrieved on May 23, 2022], Retrieved from the Internet: <URL: https://www.sciencedirect.com/science/article/pii/S1877050917312292>. (Year: 2017).*

Aroussi et al. "Survey on Machine Learning-based QoE-QoS Correlation Models", 2014 ComManTel Confnce, Apr. 27, 2014, pp. 200-204. INSPEC Accession No. 14350841. DOI No. 10.1109/ComManTel.2014.6825604. (Year: 2014).*

International Search Report dated May 31, 2015 in PCT/EP2019/060285 filed Apr. 23, 2019.

Vaser, M., et al., "QoS KPI and QoE KQI relationship for LTE Video Streaming and VoLTE Services", $9^{th}$ International Conference on Next Generation Mobile Applications, Services and Technologies, IEEE, XP032843342, DOI: 10.1109/NGMAST.2015.34, ISBN: 978-1-4799-8660-6, 2015, pp. 318-323.

* cited by examiner

METHOD AND SYSTEM FOR DETERMINING A QUALITY OF EXPERIENCE DURING A REAL-TIME COMMUNICATION SESSION

BACKGROUND OF THE INVENTION

Field of the Invention

The present invention generally relates to a communication system (e.g., an "Evolved Packet System") comprising an "IP Multimedia Subsystem" providing IP multimedia services. More particularly, the present invention relates to a method and system for determining a reliable and accurate Quality of Experience during a real-time communication session (such as a VoLTE call).

Overview of the Related Art

International standardization bodies like 3GPP (www.3gpp.org), GSMA (www.gsma.org) and OMA ("Open Mobile Alliance") specify functional modules and procedures of IP multimedia services including "Voice Over LTE" (VoLTE).

VoLTE is defined in GSMA IR.92, and represents a basic implementation profile of the 3GPP MMTEL ("Multi Media Telephony over IMS") service to support voice services on communication systems.

Considering for example an "Evolved Packet System" (hereinafter, EPS system) as a communication system, the IP multimedia services (such as VoLTE calls) are provided by (i.e. delivered through) an IP Multimedia Subsystem (IMS), hereinafter IMS network. By IMS network it is meant an architectural framework for delivering the IP multimedia services to user devices of (i.e., connecting to) the EPS system, where the user devices connect to the IMS network by means of a radio access network (e.g., a LTE radio access network), and the IMS network delivers the IP multimedia services by orchestrating (i.e., arranging or managing or handling) connection of the user devices to PDN network(s), such as IP networks.

With the spread of IP multimedia services, and particularly of real-time communication sessions over IP (such as VoLTE calls), operators of the communication system are becoming more and more interested in measuring customer experience (Quality of Experience) of the VoLTE call in order to prevent quality issues on the communication system, before the user perceives them.

The Quality of Experience has been defined by ITU-T SG12 (2007) as "the overall acceptability of an application or service, as perceived subjectively by the end user", and it is related to the specific service delivery. It is defined by qualitative indicators, named "Key Quality Indicators" (KQIs), influenced by total end-to-end effects on the communication system, as well as user expectations and degree of delight or annoyance during the fruition of a service. For this reason, it is difficult to express Quality of Experience in an objective and mathematical way, as it can depend both from the context in which the user operates and from the quality negotiated with the communication system operator for a specific service.

On the other hand, the Quality of Service is considered as "the ability of the network to provide a service at a guaranteed performance level". It is assured by the differentiated management of the various traffic classes, and it is a technical, objective and network oriented entity, mathematically expressed by network parameters, obtained by monitoring operations on the network. These parameters, defined by standardization organizations, are called "Network Key Performance Indicators" (KPIs), and they do not depend on the service under monitoring.

A common approach to obtain a realistic indicator of the Quality of Experience for voice services is based on performing "Perceptual Objective Listening Quality Analysis" (POLQA) measurements (defined in ITU-T P.863) in test scenarios on user devices conveniently equipped with dedicated test tools.

The Applicant is aware of the following solutions aimed at establishing a connection between Quality of Experience perceived by the customer and Quality of Service offered by the communication system.

T. Hossfeld, D. Hock, P. Tran-Gia, K. Tutschku, M. Fielder, "Testing the IQX Hypothesis for Exponential Interdependency between QoS and QoE of Voice Codecs iLBC and G.711", 18th Seminar on Quality Experience, Sweden 2008, investigates the IQX hypothesis for two voice codecs, iLBC and G.711, in order to obtain a quantitative relationships between user-perceived Quality of Experience and network Quality of Service. This hypothesis expresses Quality of Experience as an exponential function of Quality of Service degradation. This paper reports results of experiment carried out in a controlled environment using the softphone SJPhone, the network emulator NIST Net, and a tool calculating the PESQ ("Perceptual Evaluation of Speech Quality") from sent and received audio files. The IQX hypothesis is confirmed exactly for disturbances perceived on applications level, packet loss and packet reordering, which correlate to the main sensitivities of the used softphone to packet-level disturbances such as loss, jitter and reordering.

A. Kovac, M. Halas, M. Orgon, M. Voznak, "E-Model MOS Estimate Improvement through Jitter Buffer Packet Loss Modelling", Information and Communication Technologies and Services, Vol 9, n. 5, 2011, analyses the dependence of MOS as a voice call quality (QoS) measure estimated through ITU-T E-model under real network conditions with jitter. In this paper, a method of jitter effect estimation is proposed. Jitter as voice packet time uncertainty appears as increased packet loss caused by jitter memory buffer underflow or overflow. Jitter buffer behavior at receiver's side is modelled as Pareto/D/1/K system with Pareto-distributed packet interarrival times and its performance is experimentally evaluated by using statistic tools. Jitter buffer stochastic model is then incorporated into E-model in an additive manner accounting for network jitter effects via excess packet loss complementing measured network packet loss. Proposed modification of E-model input parameter adds two degrees of freedom in modelling: network jitter and jitter buffer size.

ITU-T Recommendation G.107, "The E-Model: A Computational Model for Use in Transmission Planning", December 2011 provides the algorithm for the so-called E-model as the common ITU-T transmission rating model. This computational model can be useful to transmission planners, to help ensure that users will be satisfied with end-to-end transmission performance. The primary output of the model is a scalar rating of transmission quality. A major feature of this model is the use of transmission impairment factors that reflect the effects of modern signal processing devices.

ITU-T Recommendation P.863, "Methods for objective and subjective assessment of speech quality—Perceptual Objective Listening Quality Assessment", September 2014, describes an objective method for predicting overall listening speech quality from narrowband (NB) (300 to 3 400 Hz) to super-wideband (SWB) (50 to 14 000 Hz) telecommunication scenarios as perceived by the user in an ITU-T P.800 or ITU-T P.830 absolute category rating (ACR) listening-only test. ITU-T Recommendation P.863 supports two operational modes, one for narrowband and one for super-wideband.

ITU-T G.109 Amendment 1, "Definition of Categories of Speech Transmission Quality Amendment 1: New Appendix I—The E-Model Based Quality Contours for Predicting Speech Transmission Quality and User Satisfaction from Time-Varying Transmission Impairments", January 2007, defines five categories of end-to-end speech transmission quality for 3.1 kHz handset telephony. These categories are defined as ranges of speech transmission quality in terms of "user satisfaction", tied to the ratings given by the transmission planning tool of Recommendation G.107 which takes into account the combined effects of various transmission impairments.

SUMMARY OF INVENTION

The Applicant has found that none of the solutions known in the art is fully satisfactory, when applied to real VoLTE traffic.

In fact, as for the common approach based on performing POLQA measurements in test scenarios on user devices conveniently equipped with dedicated test tools, the Applicant has understood that, since a few user devices are or can be equipped with the dedicated test tools, the resulting POLQA measurements identify a sample of measurements that are not statistically relevant, due to the low number of samples that can be obtained by the user devices, thus resulting in an inadequate statistical evaluation of Quality of Experience.

As for the solutions in Hossfeld and Kovac papers, and the solutions disclosed in ITU-T Recommendation G.107, the Applicant has ascertained that none of them allows obtaining a reliable and accurate Quality of Experience of a real VoLTE call, e.g. similar to the one that can be obtained based on ITU-T Recommendation P.863 and ITU-T G.109 Amendment 1.

The Applicant has faced the above mentioned issues, and has devised a solution for determining a reliable and accurate Quality of Experience during a real-time communication session, such as VoLTE call.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for determining, in a communication system, a Quality of Experience associated with a real-time communication session between user devices of the communication system. The method comprises:

starting the real-time communication session;

monitoring the real-time communication session and determining, during the real-time communication session, at least one quality indicator indicative of the Quality of Experience, and at least one first performance indicator indicative of a Quality of Service and at least one second performance indicator indicative of the Quality of Service;

based on the at least one quality indicator and the at least one first performance indicator, determining a correlation function indicative of the correlation between the Quality of Experience and the Quality of Service in respect of the monitored real-time communication session;

determining a parameter of the Quality of Service depending on both the at least one first performance indicator and the at least one second performance indicator, and applying said parameter to the correlation function to determine said Quality of Experience.

According to an embodiment of the present invention, said determining a correlation between the Quality of Experience and the Quality of Service in respect of the monitored real-time communication session comprises determining said correlation function in respect of the monitored real-time communication session among a family of correlation functions being indicative of the correlation between the Quality of Experience and a Quality of Service in respect of a generic real-time communication session.

According to an embodiment of the present invention, said determining a correlation function comprises:

providing said correlation function family, and based on the at least one quality indicator and the at least one first performance indicator, determining a value of at least one coefficient of the correlation function family and, preferably, applying the determined value of the at least one coefficient to the correlation function family to determine the correlation function in respect of the monitored real-time communication session.

According to an embodiment of the present invention, said determining a value of at least one coefficient of the correlation function family is based on at least one previous value of said at least one coefficient.

According to an embodiment of the present invention, said at least one previous value of said at least one coefficient is associated each one with a respective previous real-time communication session started by a same user device.

According to an embodiment of the present invention, the at least one first performance indicator comprises one or more among jitter and packet loss.

According to an embodiment of the present invention, the at least one second performance indicator comprises jitter buffer size.

According to an embodiment of the present invention, the said parameter comprises an effective packet loss depending on jitter, packet loss and jitter buffer size.

According to an embodiment of the present invention, the at least one quality indicator comprises the Mean Opinion Score.

According to an embodiment of the present invention, said determining at least one quality indicator comprises determining the Mean Opinion Score according to E-model transmission rating model defined in ITU-T G107 Recommendation.

According to an embodiment of the present invention, the Mean Opinion Score is associated with one or more among the user devices of the real-time communication session.

According to an embodiment of the present invention, said correlation function family is indicative of an exponential correlation between the Quality of Experience and the Quality of Service.

According to an embodiment of the present invention, said correlation function family is based on IQX hypothesis.

According to an embodiment of the present invention, said monitoring at least one quality indicator, and at least one first performance indicator and at least one second performance indicator is carried out over at least one among:

a network interface between a radio base station of the communication system and a Serving Gateway module of the communication system;

a network interface between the Serving Gateway module of the communication system and a Packet Data Network Gateway module of the communication system;

a radio interface between a Proxy-Call Session Control Function module of the communication system and an Interrogating/Serving Call State Control Function module of the communication system.

According to an embodiment of the present invention, the method further comprises repeating said:

determining at least one quality indicator of the Quality of Experience, and at least one first performance indicator of the Quality of Service and at least one second performance indicator of the Quality of Service;

determining a correlation function;

determining a parameter of the Quality of Service, and applying said parameter, while the real-time communication session is in progress.

According to an embodiment of the present invention, the real-time communication session is a Voice over LTE (VoLTE) call.

According to an embodiment of the present invention, the communication system comprises an Evolved Packet System.

Another aspect of the present invention relates to a communication system, for example an evolved packet system. The communication system comprises:

at least one measurement apparatus for monitoring and performing measurements on a real-time communication session between user devices of the communication system thereby allowing to determine, during the real-time communication session, at least one quality indicator indicative of a Quality of Experience, and at least one first performance indicator indicative of a Quality of Service and at least one second performance indicator indicative of the Quality of Service;

a processing module for determining, based on the at least one quality indicator and the at least one first performance indicator, a correlation function indicative of the correlation between the Quality of Experience and the Quality of Service in respect of the monitored real-time communication session, for determining a parameter of the Quality of Service depending on both the at least one first performance indicator and the at least one second performance indicator, and for applying said parameter to the correlation function to determine said Quality of Experience.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
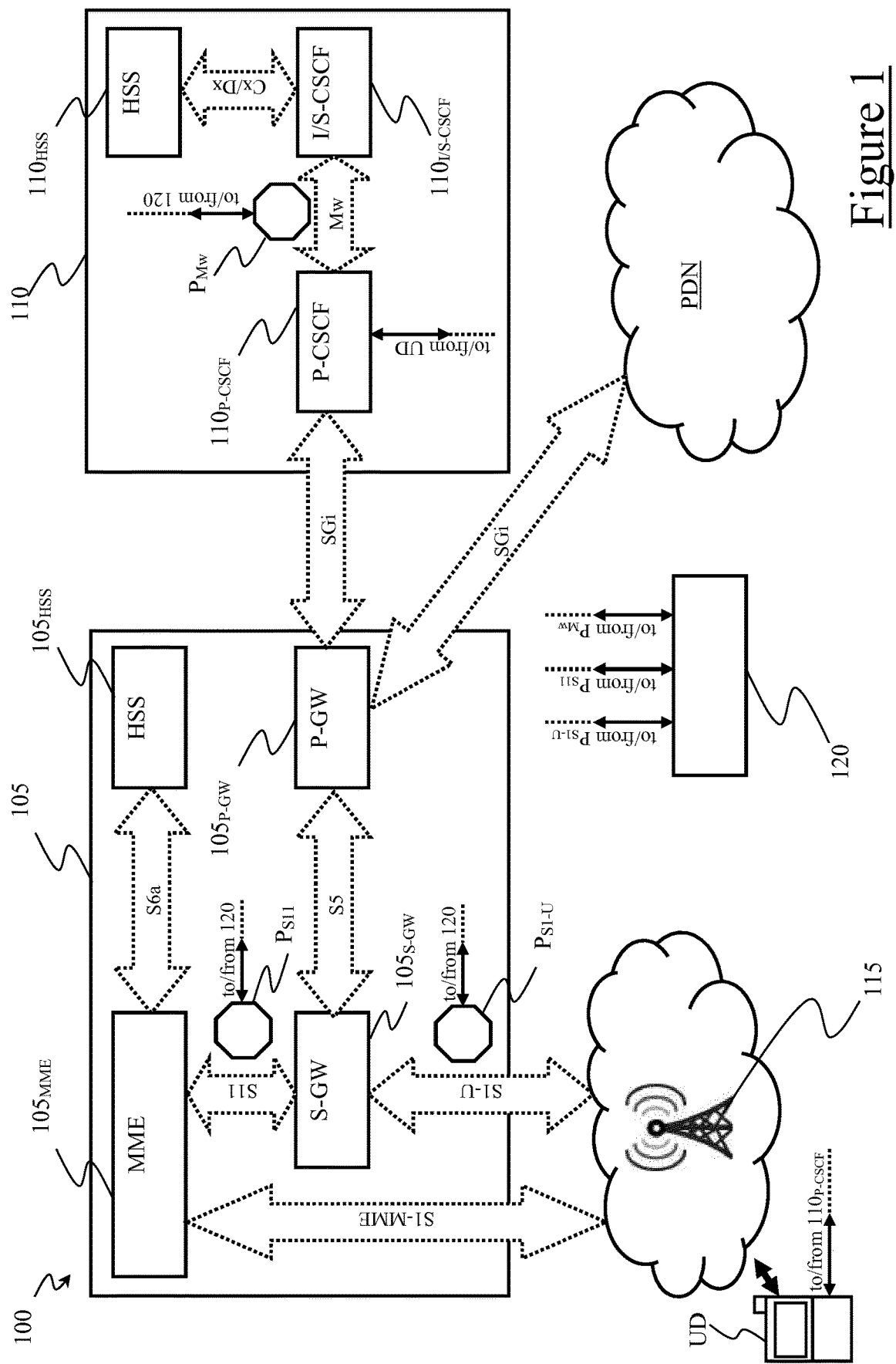
FIG. 1 shows a basic architecture of a communication system according to an embodiment of the present invention.

FIG. 1 shows a basic architecture of a communication system according to an embodiment of the present invention. The communication system is for example an Evolved Packet System (hereinafter EPS system) 100, commonly referred to also as LTE "System Architecture Evolution" (SAE) system. In the following, only components of the EPS system 100 that are relevant for the understanding of the present invention will be shown and discussed.

The communication system comprises a core network. In the example at issue of EPS system 100 as communication system, the core network is an IP-based core network, such as the "SAE"-based core network of the LTE system (or Evolved Packet Core, described in the 3GPP Technical Specification TS 23.002), and will be referred to as EPC core 105 in the following.

The EPS system 100 also comprises one or more external IP networks to which the EPC core 105 is connected. For the purposes of the present invention, the external IP network(s) comprise(s) one or more "Packet Data Networks" (or PDN networks), such as the PDN network PDN. The EPC core 105 is connected to the PDN network PDN through an IP Multimedia Subsystem (IMS), hereinafter IMS network 110. By IMS network 110 it is meant an architectural framework for delivering IP multimedia services to user devices UD (only one shown in the figure) connecting to the EPS system 100—the IP multimedia services being delivered by the IMS network 110 by orchestrating (i.e., arranging or managing or handling) connection of the user devices UD to the PDN network PDN. For the purposes of the present disclosure, a real-time communication session between user devices UD of (i.e. connecting to) the EPS system 100 will be considered as example of IP multimedia service, and particularly "Voice over LTE" (VoLTE) (hereinafter referred to as VoLTE call) will be considered as example of real-time communication session.

For the purposes of the present disclosure, a user device UD is an electronic device, external to the EPS system 100, capable of accessing IMS services (in the example at issue, capable of performing a VoLTE call by connection to the EPS system 100, and particularly to the IMS network 110), and including for example a mobile phone, a smartphone, a tablet, a personal digital assistant (PDA) or a computer.

Preferably, the user device UD is capable of accessing the IMS services (such as the VoLTE call) through a Radio Access Technology (hereinafter, RAT technology), or more thereof. Examples of RAT technologies are Bluetooth, Wi-Fi, 3G and 4G or LTE. In the preferred embodiment herein considered of EPS system as communication system, the user device UD is connected to the EPC core 105 over E-UTRAN (LTE radio access network), e.g. by means of a base station (or more thereof). In the considered example of LTE radio access network, the base station comprises an Evolved NodeB (eNodeB) 115.

For the purposes of the present disclosure, the EPC core 105 preferably comprises the following modules—the term "module" being herein intended to emphasize functional (rather than implementation) aspects thereof. Indeed, without losing generality, each module may be implemented by software, hardware, and/or a combination thereof. Moreover, the modules may also reflect, at least conceptually, the physical structure of the EPC core 105:

"Home Subscriber Server" (HSS) module $105_{HSS}$. Basically, the HSS module $105_{HSS}$ comprises a database that contains user-related and subscription-related information (subscriber profiles) and performs authentication and authorization of the users on the IMS network 110. It also provides information about user location. Preferably, the HSS module $105_{HSS}$ supports S6a interface (i.e. the network interface based on Diameter protocol and defined, for example, in 3GPP Technical Specification 29.272, between the HSS module $105_{HSS}$ and the MME module discussed here below). The subscriber profiles of the HSS module $105_{HSS}$ preferably pertain to LTE subscriber profiles;

"Mobility Management Entity" (MME) module $105_{MME}$. The MME module $105_{MME}$ is part of the EPC core 105 and is the key control-node for the LTE access network. It is responsible for idle mode user device UD paging and tagging procedure including retransmissions. It is involved in bearer activation/deactivation processes and is also responsible for choosing the S-GW module (discussed here below) for a user device UD at the initial attach and at time of intra-LTE handover involving core network node relocation. Preferably, the MME module $105_{MME}$ supports the above-mentioned S6a interface (i.e., the interface between the MME module $105_{MME}$ and the HSS module $105_{HSS}$, as described in 3GPP Technical Specification 29.272), S1-MME interface (i.e., the interface between the MME module $105_{MME}$ and the eNodeB 115, based on Non-Access Stratum (NAS) protocols defined in 3GPP Technical Specification 24.301), and S11 interface (i.e., the interface between the MME module $105_{MME}$ and the S-GW module discussed here below;

"Serving Gateway" (S-GW) module $105_{S-GW}$. The S-GW module $105_{S-GW}$ is the point of interconnect between the radio-side (i.e., the LTE radio access network in the considered example) and the EPC core 105, and serves the user device UD by routing the incoming and outgoing IP data packets. It is responsible for authenticating the users, and specifically for requesting to the HSS module $105_{HSS}$ authentication and profile of users and to update location information of the user devices UD. Preferably, the S-GW module $105_{S-GW}$ supports the above mentioned S11 interface (i.e., the interface between the MME module $105_{MME}$ and the S-GW module $105_{S-GW}$), S1-U interface (i.e., the interface between the S-GW module $105_{S-GW}$ and the eNodeB 115, as described in 3GPP Technical Specification 29.281), and S5 interface (i.e., the interface between the S-GW module $105_{S-GW}$ and the P-GW module discussed here below);

"PDN Gateway" (P-GW) module $105_{P-GW}$. The P-GW module $105_{P-GW}$ is the point of interconnect between the EPC core 105 and the PDN network PDN, and routes the IP data packets to and from the PDN network PDN. Preferably, the P-GW module $105_{P-GW}$ supports both the above mentioned S5 interface (i.e., the interface between the S-GW module $105_{S-GW}$ and the P-GW module $105_{P-GW}$) and SGi interface (i.e., the interface between the P-GW module $105_{P-GW}$ and the IMS network 110, specifically the P-CSCF module discussed here below, and between the P-GW module $105_{P-GW}$ and the PDN network PDN, as described in 3GPP Technical Specification 29.061).

For the purposes of the present disclosure, the IMS network 110 preferably comprises the following modules—again, the term "module" being herein intended to emphasize functional (rather than implementation) aspects thereof. Indeed, without losing generality, each module may be implemented by software, hardware, and/or a combination thereof. Moreover, the modules may also reflect, at least conceptually, the physical structure of the IMS network 110:

"Proxy-Call Session Control Function" (P-CSCF) module $110_{S-CSCF}$. The P-CSCF module $110_{P-CSCF}$ is the first network entity for the users accessing the IMS network 110. Specifically, the P-CSCF module $110_{P-CSCF}$ acts as a proxy server for the user device UD, it meaning that "Session Initiation Protocol" (SIP) signalling traffic to/from the user device UD goes through the P-CSCF module $110_{P-CSCF}$ (see connection between the P-CSCF module $110_{P-CSCF}$ and the user device UD in the figure). Preferably, the P-CSCF module $110_{P-CSCF}$ supports the above mentioned SGi interface between the P-GW module $105_{P-CSCF}$ and the P-CSCF module $110_{P-CSCF}$, and Mw interface (i.e., the interface defined in 3GPP Technical Specification 24.229 between the P-CSCF module $110_{P-CSCF}$ and the I/S-CSCF module discussed here below);

"Interrogating/Serving Call State Control Function" (I/S-CSCF) module $110_{I/S-CSCF}$. The I/S-CSCF module $110_{I/S-CSCF}$ comprises an I-CSCF (Interrogating CSCF) entity (not shown), and a S-CSCF (Serving CSCF) entity (not shown). The I-CSCF entity queries a HSS module of the IMS network 110 (discussed here below), e.g. by means of Diameter Cx and Dx interfaces, to retrieve the address of the S-CSCF entity and assign it to the user to which the user device UD having requested a VoLTE call belongs, and forwards requests or responses to the S-CSCF entity. The S-CSCF entity is responsible for processing the location registration of each user device UD, user authentication, call routing and processing. Similar to the I-CSCF entity, the S-CSCF entity supports Diameter Cx and Dx interfaces to the further HSS module to download from it the user-related and subscription-related information;

"Home Subscriber Server" (HSS) module $110_{HSS}$. Basically, the HSS module $110_{HSS}$ comprises, similarly to the HSS module $105_{HSS}$, a database that contains user-related and subscription-related information (subscriber profiles) and performs authentication and authorization of the users on the IMS network 110. Differently from the HSS module $105_{HSS}$, the subscriber profiles of the HSS module $110_{HSS}$ preferably pertain to VoLTE subscriber profiles. Preferably, the HSS module $110_{HSS}$ supports the above mentioned Csx and Dx interfaces.

As visible in the figure, the EPS system 100 preferably comprises one or more measurements apparatuses, for example placed at predetermined "Point of Control and Observation (PCO), for monitoring the VoLTE call (or other real-time communication session) and determining (i.e., measuring) during the VoLTE call (or other real-time communication session) at least one quality indicator of a Quality of Experience and at least one performance indicator of a Quality of Service. In the example at issue, the EPS system 100 comprises a measurement apparatus $P_{S1-U}$ for measuring the quality indicator(s) and the performance indicator(s) over the S1-U interface (i.e., according to the data exchanged between the eNodeB 115 and the S-GW module $105_{S-GW}$), a measurement apparatus $P_{S11}$ for measuring the quality indicator(s) and the performance indicator(s) over the S11 interface (i.e., according to the data exchanged between the S-GW module $105_{S-GW}$ and the MME module $105_{MME}$), and a measurement apparatus $P_{Mw}$ for measuring the quality indicator(s) and the performance indicator(s) over the Mw interface (i.e., according to the data exchanged between the P-CSCF module $110_{P-CSCF}$ and the I/S-CSCF module $110_{I/S-CSCF}$); however, one or more different measurement apparatuses may be provided additionally or alternatively to one or more among the measurement apparatuses $P_{S1-U}$, $P_{S11}$, $P_{Mw}$. Moreover, each measurement apparatus $P_{S1-U}$, $P_{S11}$, $P_{Mw}$ may be arranged to measure respective quality indicators and/or performance indicators.

The EPS system 100 also comprises a processing module 120 for determining a reliable and accurate Quality of Experience associated with (i.e. in respect of) the monitored VoLTE call (or other monitored ongoing real-time communication session) between user devices UD of the EPS system 100, based on a correlation function indicative of a correlation or interdependency between the Quality of Experience and the Quality of Service, and on the quality and performance indicators measured by the measurement apparatuses $P_{S1-U}$, $P_{S11}$, $P_{Mw}$ (see the functional connection between the measurement apparatuses $P_{S1-U}$, $P_{S11}$, $P_{Mw}$ and the processing module 120). The processing module 120 may be implemented by software (in which case, the resulting method or procedure, discussed in the following, for determining the Quality of Experience would be performed by proper code means included in a computer program, when the program is run on a computer), hardware, and/or a combination thereof. Moreover, the processing module 120 is illustrated in the figure as external to both the EPC core 105 and the IMS network 110; however, as should be understood, the processing module 120 may be physically located in the EPC core 105 (e.g., in one or more modules thereof) and in the IMS network 110 (e.g., in one or more modules thereof).

Preferably, the quality indicator(s) comprise(s) one or more "Key Quality Indicators" (hereinafter, KQIs), i.e. the quality indicators depending on end-to-end network effects, user expectations, and degree of delight or annoyance during the fruition of a service, and identifying as a whole the Quality of Experience. According to ITU-T SG12 (2007), the Quality of Experience is "the overall acceptability of an application or service, as perceived subjectively by the end user", and is related to the specific service delivery. According to the exemplary embodiment of the present invention, the KQI is the "Mean Opinion Score" (MOS), which is indicative of the overall quality of a stimulus or system, and is defined as the arithmetic mean over all individual "values on a predefined scale that a subject assigns to his opinion of the performance of a system quality" (ITU-T Rec. P.10 (2006) "Vocabulary for performance and quality of service"). In the example, at issue, the MOS will be taken into account as the most significant KQI, and as capable, alone, to provide a reliable and accurate indication of the Quality of Experience: this assumption is justified by the fact that, as better discussed below, the method according to the present invention allows obtaining an optimized MOS value that approaches POLQA measurements (the optimized MOS value being optimized with respect to, for example, the conventional MOS value obtained according to ITU-T G.107 Recommendation).

Preferably, the performance indicator(s) comprise(s) one or more "Key Performance Indicators" (hereinafter, KPIs), i.e. the quantitative indicators depending on network measurements and identifying as a whole the Quality of Service. According to ITU-T SG12 (2007), the Quality of Service is "the ability of the network to provide a service at a guaranteed performance level", and is not related to the service under monitoring. According to the exemplary embodiment of the present invention, the KPIs comprise at least one (preferably all) among jitter (i.e., the variation in the delay of received packets), packet loss (i.e., the percentage of packets lost with respect to packets sent), and jitter buffer size (i.e., the amount of time that elapses between the time at which a voice packet is received at the jitter buffer and the time at which it is played out to the codec, and known also as playout delay). Preferably, the network measurements (or at least a subset thereof) for determining the KPIs are based on data flows delivered over Real-time Transport Protocol (hence, at application level). Other KPIs may be used in other embodiments of the present inventions, for example additionally or alternatively to one or more among jitter, packet loss and jitter buffer size.

Figure 2:
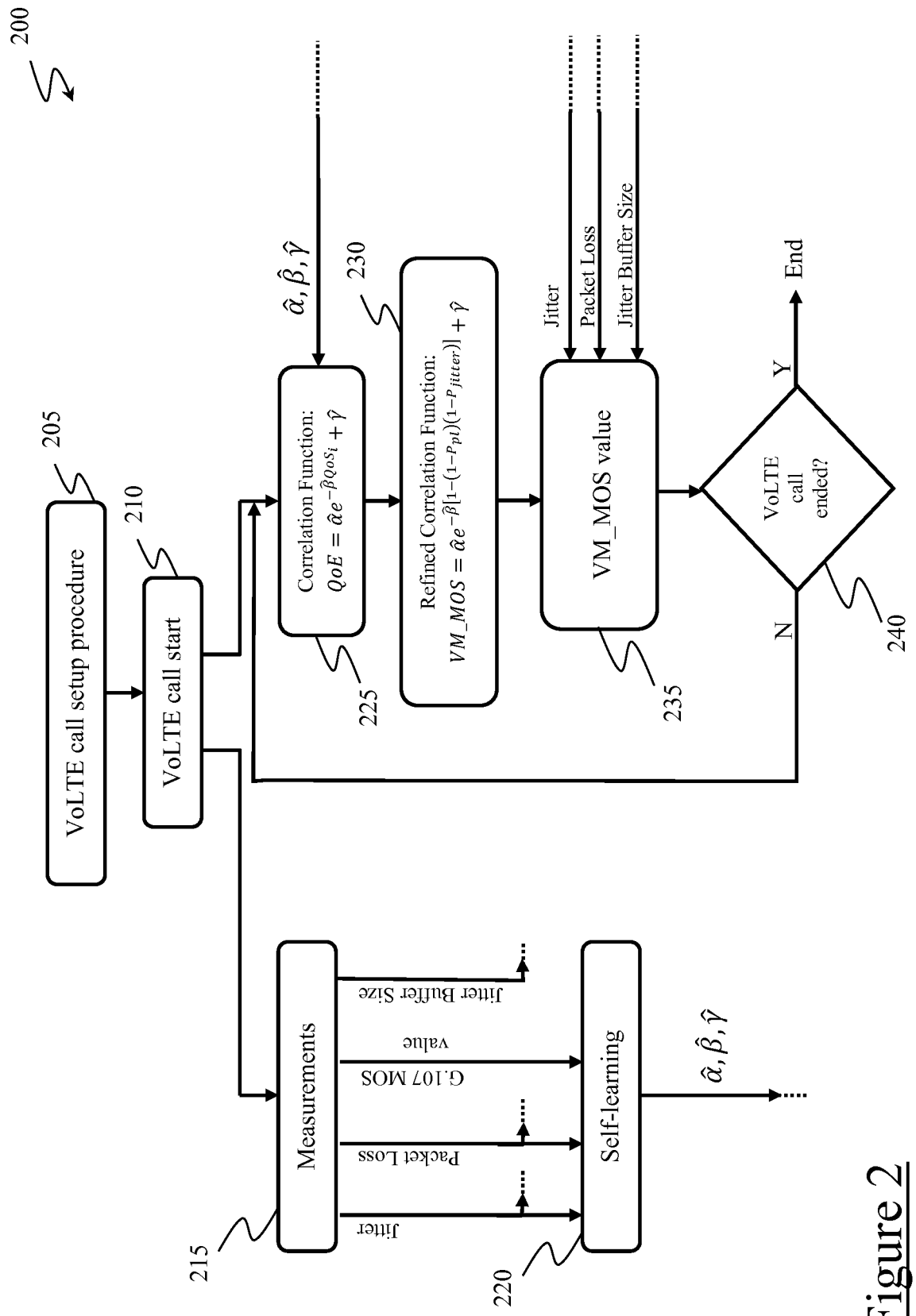
FIG. 2 shows an activity diagram of a method for determining MOS, according an embodiment of the present invention.

With reference now to FIG. 2, it shows an activity diagram of a method 200 for determining a reliable and accurate Quality of Experience (and specifically an optimized MOS value) associated with a VoLTE call (or with an ongoing real-time communication session) between user devices UD of (i.e. connecting to) the EPS system 100, according to an embodiment of the present invention.

After the execution of the procedures for setting up the VoLTE call (action node 205), and the beginning or starting of the VoLTE call or of other the real-time communication session (action node 210), one or more performance indicators (for example, one or more KPIs such as jitter, packet loss and/or jitter buffer size, all of them in the example at issue) and one or more quality indicators (for example, one or more KQIs, such as a MOS value in the example at issue) are determined through measurements performed by the measurement apparatuses $P_{S1-U}$, $P_{S11}$, $P_{Mw}$ (action node 215).

The MOS value determined at action node 215 is for example compliant with the E-Model transmission rating model defined in ITU-T G.107 Recommendation (reason why, from now on, it will be referred to as G.107 MOS value), and represents a measure of the voice quality at the PCOs where the measurement apparatuses $P_{S1-U}$, $P_{S11}$, $P_{Mw}$ are placed. The G.107 MOS value represents a rough approximation of the MOS value that can be obtained by performing "Perceptual Objective Listening Quality Analysis" (POLQA) measurements (defined in ITU-T P.863) in test scenarios on user devices conveniently equipped with dedicated test tools (as will be better understood from the following discussion, the optimized MOS value, hereinafter referred to as VM_MOS value, according to the method 200 provides a statistically relevant MOS value, similarly to the G.107 MOS value, while significantly approaching to POLQA measurements).

Preferably, the G.107 MOS value and the KPIs obtained at action node 215 are (all or a subset thereof) the inputs of a self-learning process (action node 220).

The self-learning process is preferably aimed at determining values of one or more coefficients of a correlation function family, the correlation function family being indicative of the correlation between the Quality of Experience and the Quality of Service in respect of a generic VoLTE call (or other real-time communication session) and preferably depending on said one or more coefficients. In other words, the correlation function family encompasses a plurality of correlation functions, wherein each combination of values of the coefficients identifies a respective correlation function, with each correlation function that is indicative of the correlation between the Quality of Experience and the Quality of Service in respect of a specific, monitored, VoLTE call (or other real-time communication session).

Preferably, the correlation function family is indicative of an exponential correlation between the Quality of Experience and the Quality of Service. More preferably, the correlation function family is based on IQX hypothesis (see, for example, T. Hossfeld, D. Hock, P. Tran-Gia, K. Tutschku, M. Fielder, "Testing the IQX Hypothesis for Exponential Interdependency between QoS and QoE of Voice Codecs iLBC and G.711", 18th Seminar on Quality Experience, Sweden 2008, and Fiedler M., Hossfeld T., Tran-Gia P., Blekinge Inst. of Technol., Karlskrona, Sweden; "A generic quantitative relationship between quality of experience and quality of service", Network, IEEE (Volume: 24, Issue: 2), 2010), which establishes a mathematical relationship between Quality of Experience and Quality of Service that is valid for Voice over IP application in simulated scenarios:

$$QoE = \alpha e^{-\beta QoS_i} + \gamma$$

wherein QoE denotes the Quality of Experience, $QoS_i$ denote the i-th performance indicator of the Quality of Service (in fact, in IQX Hypothesis, only the correlation of one performance indicator of the Quality of Service per time with the Quality of Experience has been validated), and $\alpha$, $\beta$, and $\gamma$ are the coefficients of the correlation function family; in the example at issue of correlation function family based on IQX hypothesis, the coefficients $\alpha$, $\beta$, and $\gamma$ are non-linear regression factors.

Based on the G.107 MOS value, and on a subset of the KPIs based on the measurements performed by the measurement apparatuses $P_{S1-U}$, $P_{S11}$, $P_{Mw}$-preferably, jitter and packet loss—the values of the coefficients $\alpha$, $\beta$, and $\gamma$ of the correlation function family are determined (action node 220) and applied to the correlation function family thereby obtaining the corresponding correlation function (action node 225):

$$QoE = \hat{\alpha} e^{-\hat{\beta} QoS_i} + \hat{\gamma}$$

Wherein $\hat{\alpha}$, $\hat{\beta}$, $\hat{\gamma}$ denote the values of the coefficients $\alpha$, $\beta$, and $\gamma$.

Preferably, the values $\hat{\alpha}$, $\hat{\beta}$, $\hat{\gamma}$ of the coefficients $\alpha$, $\beta$, and $\gamma$ are determined based on one or more previous values of the same coefficients (for example, by using them in fitting operations), each previous value being for example associated with a respective previous real-time communication session started by a same user device (i.e., the calling side in the example at issue of VoLTE call).

As visible in the figure, the action nodes 215 and 220 are illustrated in a branch parallel to the branch containing the nodes 225-235, where the VM_MOS value is actually computed (as discussed here below); this is a mere conceptual representation of the preferred embodiment of the present invention herein considered in which the measurements performed by the measurement apparatuses $P_{S1-U}$, $P_{S11}$, $P_{Mw}$, and the computation of the values $\hat{\alpha}$, $\hat{\beta}$, $\hat{\gamma}$ of the coefficients $\alpha$, $\beta$, $\gamma$ take place as long as the VoLTE call is in progress; therefore, at each iteration for computing or refining the computing of the VM_MOS value, updated measurements of the KPIs, of the KQIs and of the values $\hat{\alpha}$, $\hat{\beta}$, $\hat{\gamma}$ of the coefficients $\alpha$, $\beta$, $\gamma$ are available and preferably used.

According to a preferred, not limiting, embodiment of the present invention, measurements are carried out and collected by each measurement apparatus $P_{S1-U}$, $P_{S11}$, $P_{Mw}$ independently and subsequently sent to and aggregated by the processing module 120, which in turn determines or computes packet loss (e.g., expressed in number of lost "Real-time Transport Protocol" (RTP) packets), jitter delay (e.g., expressed in milliseconds), jitter buffer size (e.g., expressed in milliseconds) and the G.107 MOS value, as well as the calculation of the values $\hat{\alpha}$, $\hat{\beta}$, $\hat{\gamma}$ of the coefficients $\alpha$, $\beta$, $\gamma$ during the self-learning process in action node 220.

Preferably, the packet loss, the jitter delay, the jitter buffer size, the G.107 MOS value, and the values $\hat{\alpha}$, $\hat{\beta}$, $\hat{\gamma}$ of the coefficients $\alpha$, $\beta$, $\gamma$ (or at least a subset thereof), are determined according to measurements associated with both the calling side (i.e., of the user device whose user has initiated the VoLTE call) and the called side (i.e., of the user device whose user has received the VoLTE call), and more preferably by averaging (possibly with application of proper weights) the corresponding measurements associated with both the calling side and the called side. However, embodiments of the present invention may be envisaged in which the packet loss, the jitter delay, the jitter buffer size, the G.107 MOS value, and the values $\hat{\alpha}$, $\hat{\beta}$, $\hat{\gamma}$ of the coefficients $\alpha$, $\beta$, $\gamma$ (or at least a subset thereof) are determined according to measurements associated with either the calling side or the called side.

Back to the activity diagram, the method 200 goes on at action nodes 225-235: starting from the correlation function indicative of the correlation between the Quality of Experience and the Quality of Service in respect of the specific, monitored, VoLTE call (action node 225), a refined correlation function is preferably determined that correlates the Quality of Experience and the Quality of Service in respect of the specific, monitored, VoLTE call (action node 230), and the VM_MOS value is computed, preferably based on the refined correlation function (action node 235).

Preferably, the refined correlation function is determined by using, as $QoS_i$ in the correlation function relationship, a parameter that combines (i.e., takes into account or correlates) more than one KPI concurrently. According to an embodiment of the present invention, this parameter comprises the effective packet loss $P_{pl,eff}$ disclosed in A. Kovac, M. Halas, M. Orgon, M. Voznak, "E-Model MOS Estimate Improvement through Jitter Buffer Packet Loss Modelling", Information and Communication Technologies and Services, Vol 9, n. 5, 2011, which is incorporated herein by reference, and defined as follows:

$$P_{pl,eff} = 1 - (1 - P_{pl})(1 - P_{jitter})$$

wherein $P_{pl,eff}$ is the effective packet loss, $P_{pl}$ is the packet loss probability, preferably calculated according to the packet loss determined at action node 215 (e.g. with values between 0-1 range), and $P_{jitter}$ is the jitter probability, preferably calculated according to jitter and jitter buffer size determined at action node 215 and by exploiting the Pareto distribution.

Therefore, the refined correlation function of the Quality of Experience (and particularly of the VM_MOS value in the example at issue where MOS has been selected as most significant or representative KQI of the Quality of Experience) is the following (where, in the expression below, the VM_MOS denotes the variable associated with the VM_MOS value, and the i-th performance indicator $QoS_i$ of the Quality of Service has been replaced by the expression of the effective packet loss $P_{pl,eff}$):

$$VM\_MOS = \hat{\alpha} e^{-\hat{\beta}[1-(1-P_{pl})(1-P_{jitter})]} + \hat{\gamma}$$

Then, action node 235, the VM_MOS value is preferably determined according to the refined correlation function, and to the values of packet loss, jitter and jitter buffer size determined at action node 215.

Preferably, as mentioned above, action nodes 225-235 are repeated as long as the VoLTE call is in progress, i.e. until the VoLTE call has ended. In order to achieve that, the method 200 preferably checks, after having calculated the VM_MOS value, whether the VoLTE call has ended: in the affirmative case (i.e. VoLTE call ended), exit branch Y of decision node 240, the method 200 ends; in the negative case (i.e. VoLTE call still in progress), exit branch N of decision node 240, the method 200 jumps back to action node 225, where another VM_MOS value is determined according to updated quality and performance indicators (for example, G.107 MOS value, jitter, packet loss, jitter buffer size), which in turn are based on new or updated measurements carried out by the measurement apparatuses $P_{S1-U}$, $P_{S11}$, $P_{Mw}$ (such that, at each repetition of the steps at action nodes 225-235, a more and more reliable and accurate VM_MOS value is obtained).

Although in the foregoing the determination of the correlation function based on the values of the coefficients α, β, and γ of the correlation function family has been considered, this should not be construed as a limitation: in fact, the principles of the present invention equivalently apply when other processes are used for determining the correlation function in respect of the monitored real-time communication session: just as an example, the self-learning process may be configured to determine by itself the correlation function (instead of determining the values of the coefficients α, β, and γ of a predefined correlation function family, as in the preferred embodiment discussed in the foregoing). In order to achieve that, the self-learning process may be configured to build, and preferably to continuously update, a correlation function based on historical G.107 MOS values and historical KPIs properly processed by interpolations, filtering, statistical analysis, forecasting and modelling techniques.

Moreover, although in the foregoing a refined correlation function has been considered which makes use of a parameter that combines more than one KPI concurrently, this should not be construed as a limitation: in fact, the principles of the present invention equivalently apply when the KPIs are applied singularly to the correlation function (for example, the correlation function determined at action node 225), so as to obtain respective MOS values that may be properly combined or weighted in order to obtain the VM_MOS value.

Thanks to the proposed method 200, the VM_MOS value is determined according to performance indicators obtained by monitoring operations on the network (thus, by using data traffic information that is easily accessible for the communication network operators), and provides a realistic and optimized indication of the Quality of Experience associated with the ongoing VoLTE call. Therefore, this is highly advantageous compared to the state of the art, which allows achieving a realistic indicator of the Quality of Experience (for example, a realistic MOS value) only by performing "Perceptual Objective Listening Quality Analysis" (POLQA) measurements (defined in ITU-T P.863) in test scenarios on user devices conveniently equipped with dedicated test tools: however, since a few user devices are or can be equipped with the dedicated test tools, the resulting POLQA measurements identify a sample of measurements that are not statistically relevant. On the contrary, the proposed method 200 is based on the use of measurement apparatuses in the communication system that can perform monitoring operations, by collecting a high number of measurements of the performance and quality indicators from different VoLTE call sessions, which becomes statistically relevant.

In order to evaluate the accuracy of the VM_MOS value calculated according to the proposed method, VM_MOS values are shown in the following table by comparison with POLQA measurements collected by test devices end-to-end and with values of the G.107 MOS value:

|  | G.107 MOS | VM_MOS | POLQA |
| --- | --- | --- | --- |
| Day 1 | 3.21 | 3.39 | 3.46 |
| Day 2 | 3.14 | 3.44 | 3.46 |
| Day 3 | 3.24 | 3.4 | 3.46 |
| Day 4 | 2.89 | 3.4 | 3.47 |
| Day 5 | 3.15 | 3.39 | 3.46 |
| Day 6 | 3.16 | 3.33 | 3.48 |
| Day 7 | 3.17 | 3.41 | 3.48 |

As visible in the table, the proposed method allows obtaining optimized MOS values that differs from POLQA measurements by 0.02 in the best case and 0.15 in the worst case, as opposed to the G.107 MOS values that differ from POLQA measurements by 0.25 in the best case and 0.58 in the worst case. Therefore, the VM_MOS values according to the proposed method provide statistically relevant MOS values, similarly to the G.107 MOS values, but significantly approaching to POLQA measurements.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the Evolved Packet System has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

The invention claimed is:
1. A method for determining, in a communication system, a Quality of Experience associated with a real-time communication session between user devices of the communication system, the method comprising:
  starting the real-time communication session;
  monitoring the real-time communication session and determining, during the real-time communication session, at least one quality indicator indicative of the Quality of Experience, and at least one first perfor- mance indicator indicative of a Quality of Service and at least one second performance indicator indicative of the Quality of Service;

based on a self-learning process to which the at least one quality indicator and the at least one first performance indicator are applied, determining and continuously updating a correlation function indicative of the correlation between the Quality of Experience and the Quality of Service in respect of the monitored real-time communication session;

determining a parameter of the Quality of Service depending on both the at least one first performance indicator and the at least one second performance indicator, and applying said parameter to the correlation function to determine said Quality of Experience, wherein said determining a correlation function includes determining a value of at least one coefficient of the correlation function based on a previous value of the coefficient of the correlation function, and the at least one second performance indicator comprises jitter buffer size.

2. The method according to claim 1, wherein said determining a correlation function between the Quality of Experience and the Quality of Service in respect of the monitored real-time communication session further comprises determining said correlation function in respect of the monitored real-time communication session among a family of correlation functions being indicative of the correlation between the Quality of Experience and a Quality of Service in respect of a generic real-time communication session.

3. The method according to claim 2, wherein said determining a correlation function comprises:

providing said correlation function family, and based on the at least one quality indicator and the at least one first performance indicator, determining a value of at least one other coefficient of the correlation function family and applying the determined value of the at least one other coefficient to the correlation function family to determine the correlation function in respect of the monitored real-time communication session.

4. The method according to claim 3, wherein said determining a value of at least one other coefficient of the correlation function family is based on at least one previous value of said at least one other coefficient.

5. The method according to claim 4, wherein said at least one previous value of said at least one other coefficient is associated each one with a respective previous real-time communication session started by a same user device.

6. The method according to claim 1, wherein the at least one first performance indicator comprises one or more among jitter and packet loss.

7. The method according to claim 1, wherein the at least one quality indicator comprises the Mean Opinion Score.

8. The method according to claim 7, wherein said determining at least one quality indicator comprises determining the Mean Opinion Score according to E-model transmission rating model defined in ITU-T G107 Recommendation.

9. The method according to claim 7, wherein the Mean Opinion Score is associated with one or more among the user devices of the real-time communication session.

10. The method according to claim 1, wherein said correlation function family is indicative of an exponential correlation between the Quality of Experience and the Quality of Service.

11. The method according to claim 1, wherein said correlation function family is based on IQX hypothesis.

12. The method according to claim 1, wherein said monitoring at least one quality indicator, and at least one first performance indicator and at least one second performance indicator is carried out over at least one among:

a network interface between a radio base station of the communication system and a Serving Gateway module of the communication system;

a network interface between the Serving Gateway module of the communication system and a Packet Data Network Gateway module of the communication system;

a radio interface between a Proxy-Call Session Control Function module of the communication system and an Interrogating/Serving Call State Control Function module of the communication system.

13. The method according to claim 1, further comprising repeating said:

determining at least one quality indicator of the Quality of Experience, and at least one first performance indicator of the Quality of Service and at least one second performance indicator of the Quality of Service;

determining a correlation function;

determining a parameter of the Quality of Service, and applying said parameter, while the real-time communication session is in progress.

14. A method for determining, in a communication system, a Quality of Experience associated with a real-time communication session between user devices of the communication system, the method comprising:

starting the real-time communication session;

monitoring the real-time communication session and determining, during the real-time communication session, at least one quality indicator indicative of the Quality of Experience, and at least one first performance indicator indicative of a Quality of Service and at least one second performance indicator indicative of the Quality of Service;

based on a self-learning process to which the at least one quality indicator and the at least one first performance indicator are applied, determining and continuously updating a correlation function indicative of the correlation between the Quality of Experience and the Quality of Service in respect of the monitored real-time communication session;

determining, a parameter of the Quality of Service depending on both the at least one first performance indicator and the at least one second performance indicator, and applying said parameter to the correlation function to determine said Quality of Experience, wherein said determining a correlation function includes determining a value of at least one coefficient of the correlation function based on a previous value of the coefficient of the correlation function, and said parameter comprises an effective packet loss depending on jitter, packet loss and jitter buffer size.

15. A communication system comprising:

at least one measurement device configured to monitor and perform measurements on a real-time communication session between user devices of the communication system thereby allowing to determine, during the real-time communication session, at least one quality indicator indicative of a Quality of Experience, and at least one first performance indicator indicative of a Quality of Service and at least one second performance indicator indicative of the Quality of Service; and a processing device configured to, based on a self-learning process to which the at least one quality indicator and the at least one first performance indicator are applied, determine and continuously update a correlation function indicative of the correlation between the Quality of Experience and the Quality of Service in respect of the monitored real-time communication session, determine a parameter of the Quality of Service depending on both the at least one first performance indicator and the at least one second performance indicator, and apply said parameter to the correlation function to determine said Quality of Experience, wherein in determining the correlation function, the processor determines a value at least one coefficient of the correlation function based on a previous value of the coefficient of the correlation function, and the at least one second performance indicator comprises jitter buffer size.

* * * * *